(12) United States Patent
Ooishi et al.

(10) Patent No.: US 10,942,310 B2
(45) Date of Patent: Mar. 9, 2021

(54) ON-BOARD DISPLAY DEVICE

(71) Applicant: Panasonic Intellectual Property Management Co., Ltd., Osaka (JP)

(72) Inventors: Toshiharu Ooishi, Tokyo (JP); Hiroaki Sato, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/657,003

(22) Filed: Oct. 18, 2019

(65) Prior Publication Data

US 2020/0049880 A1 Feb. 13, 2020

Related U.S. Application Data (63) Continuation of application No. PCT/JP2018/015932, filed on Apr. 18, 2018.

(30) Foreign Application Priority Data

Apr. 27, 2017 (JP) .............................. JP2017-088929

(51) Int. Cl.
*F21V 8/00* (2006.01)
*G02F 1/13357* (2006.01)
*B60R 1/00* (2006.01)

(52) U.S. Cl.
CPC ......... *G02B 6/0088* (2013.01); *G02B 6/0053* (2013.01); *G02F 1/133606* (2013.01);
(Continued)

(58) Field of Classification Search
None
See application file for complete search history.

(56) References Cited

U.S. PATENT DOCUMENTS

2009/0102989 A1* 4/2009 Sakai ................. G02F 1/13476
349/1
2009/0180300 A1 7/2009 Kim et al.
(Continued)

FOREIGN PATENT DOCUMENTS

JP 2004-071189 3/2004
JP 2004071189 A * 3/2004
(Continued)

OTHER PUBLICATIONS

English translation of JP-2004071189-A, Title: Light emitting element for liquid crystal display, has prism film provided at emission surface of light guide plate, to condense light irradiated from light guide plate, Author: Yoshida M; Date of publication: Mar. 4, 2004 (Year: 2004).*

(Continued)

*Primary Examiner* — Shan Liu
(74) *Attorney, Agent, or Firm* — Greenblum & Bernstein, P.L.C.

(57) ABSTRACT

An on-board display device installable in a vehicle cabin of a vehicle includes a liquid crystal panel and a light source. The liquid crystal panel displays an image of an outside of the vehicle, the image having been captured by a camera. The light source illuminates the liquid crystal panel. A direction of maximum luminance of the light source is a direction passing through an inside of an eye range preset in the vehicle. An equi-luminance line has a shape longer in a second direction that intersects a first direction than in the first direction in a luminance distribution map that represents luminance of the light source in each direction represented by a polar angle and an azimuth angle. The second direction and a longitudinal direction of an aggregate of points which represent polar angles and azimuth angles of tangential lines of the eye range, the tangential lines passing through the center of the liquid crystal panel, on the luminance distri- (Continued)

bution map are inclined to a same side with respect to a longitudinal direction of the liquid crystal panel.

8 Claims, 7 Drawing Sheets

(52) U.S. Cl.
CPC ......... *B60R 1/00* (2013.01); *B60R 2300/8046* (2013.01); *G02B 6/0051* (2013.01); *G02B 6/0055* (2013.01)

(56) References Cited

U.S. PATENT DOCUMENTS

| | | | | |
|---|---|---|---|---|
| 2011/0254957 | A1* | 10/2011 | Eder | B60R 11/04 348/148 |
| 2013/0241908 | A1* | 9/2013 | Skrypchuk | G02F 1/133606 345/207 |
| 2015/0109561 | A1 | 4/2015 | Fuchida et al. | |
| 2016/0282542 | A1* | 9/2016 | Seo | G02B 5/045 |
| 2017/0039998 | A1 | 2/2017 | Skrypchuk | |
| 2018/0160030 | A1* | 6/2018 | Chaney, Jr. | H04N 5/232945 |
| 2019/0302521 | A1* | 10/2019 | Tane | G02F 1/133524 |

FOREIGN PATENT DOCUMENTS

| | | |
|---|---|---|
| JP | 4815930 B | 11/2011 |
| JP | 5040647 B | 10/2012 |
| JP | 5273768 B | 8/2013 |
| JP | 2013-539057 | 10/2013 |
| JP | 2014-116756 | 6/2014 |
| JP | 2016-141327 | 8/2016 |
| WO | 2013/154125 | 10/2013 |

OTHER PUBLICATIONS

International Search Report of PCT application No. PCT/JP2018/015932 dated May 22, 2018.

* cited by examiner

Front ←→ Rear

ON-BOARD DISPLAY DEVICE

This application is a continuation of the PCT International Application No. PCT/JP2018/015932 filed on Apr. 18, 2018, which claims the benefit of foreign priority of Japanese patent application No. 2017-088929 filed on Apr. 27, 2017, the contents all of which are incorporated herein by reference.

TECHNICAL FIELD

The present disclosure relates to an on-board display device that displays an image behind and of the side of a vehicle, the image having been captured by a camera.

BACKGROUND ART

An electronic mirror system has been known, which includes displays individually installed to right and left of a driver's seat in a vehicle cabin, and causes these displays to display images behind and of the side of a vehicle, the images being captured by cameras (for example, refer to PTL 1). Liquid crystal panels or the like are used as the displays.

CITATION LIST

Patent Literature

PTL 1: Unexamined Japanese Patent Publication No. 2016-141327

SUMMARY OF THE INVENTION

The present disclosure provides an on-board display device capable of making it easy for a driver to visually recognize each of the images.

An on-board display device according to an aspect of the present disclosure is an on-board display device installable in a vehicle cabin of a vehicle, and includes: a liquid crystal panel that displays an image of an outside of the vehicle, the image having been captured by a camera; and a light source that illuminates the liquid crystal panel. A direction of maximum luminance of the light source is a direction passing through an inside of an eye range preset in the vehicle. An equi-luminance line has a shape longer in a second direction that intersects a first direction than in the first direction in a luminance distribution map that represents luminance of the light source in each direction represented by a polar angle and an azimuth angle. The second direction and a longitudinal direction of an aggregate of points which represent polar angles and azimuth angles of tangential lines of the eye range, the tangential lines passing through the center of the liquid crystal panel in the luminance distribution map, are inclined to a same side with respect to a longitudinal direction of the liquid crystal panel.

Any combinations of the constituents described above and modifications of the features of the present disclosure in methods, devices, systems, and the like are still effective as other aspects of the present disclosure.

In accordance with the present disclosure, it can be made easy for the driver to visually recognize the image.

DESCRIPTION OF EMBODIMENT

Prior to description of an exemplary embodiment of the present disclosure, problems found in conventional techniques will briefly be described. In a backlight of a general liquid crystal panel, a direction of a maximum luminance is chiefly a front direction of the liquid crystal panel, and accordingly, it is sometimes difficult for a driver to visually recognize an image on a display of an electronic mirror system with a sufficient luminance depending on installation positions of the display.

Prior to specific description of the exemplary embodiment, an outline of the exemplary embodiment will be described. The exemplary embodiment relates to on-board display devices for causing a driver to confirm lateral sides on a rear of a vehicle, the on-board display devices being installable on right and left sides in a vehicle cabin. Each of the on-board display devices includes a liquid crystal panel and a backlight. The liquid crystal panel displays an image of the lateral side on the rear of the vehicle, the image having been captured by a camera. The backlight illuminates the liquid crystal panel. In the on-board display device according to the exemplary embodiment, a direction of a maximum luminance of the backlight is a direction passing through an inside of an eye range predetermined in the vehicle. In a luminance distribution map that represents luminance of the backlight in each direction, an equi-luminance line has a shape longer in a second direction that intersects a first direction than in the first direction. The second direction and a longitudinal direction of an aggregate of points which represent, on the luminance distribution map, polar angles and azimuth angles of tangential lines of the eye range, which pass through the center of the liquid crystal panel, are inclined to a same side with respect to a longitudinal direction of the liquid crystal panel.

Figure 1:
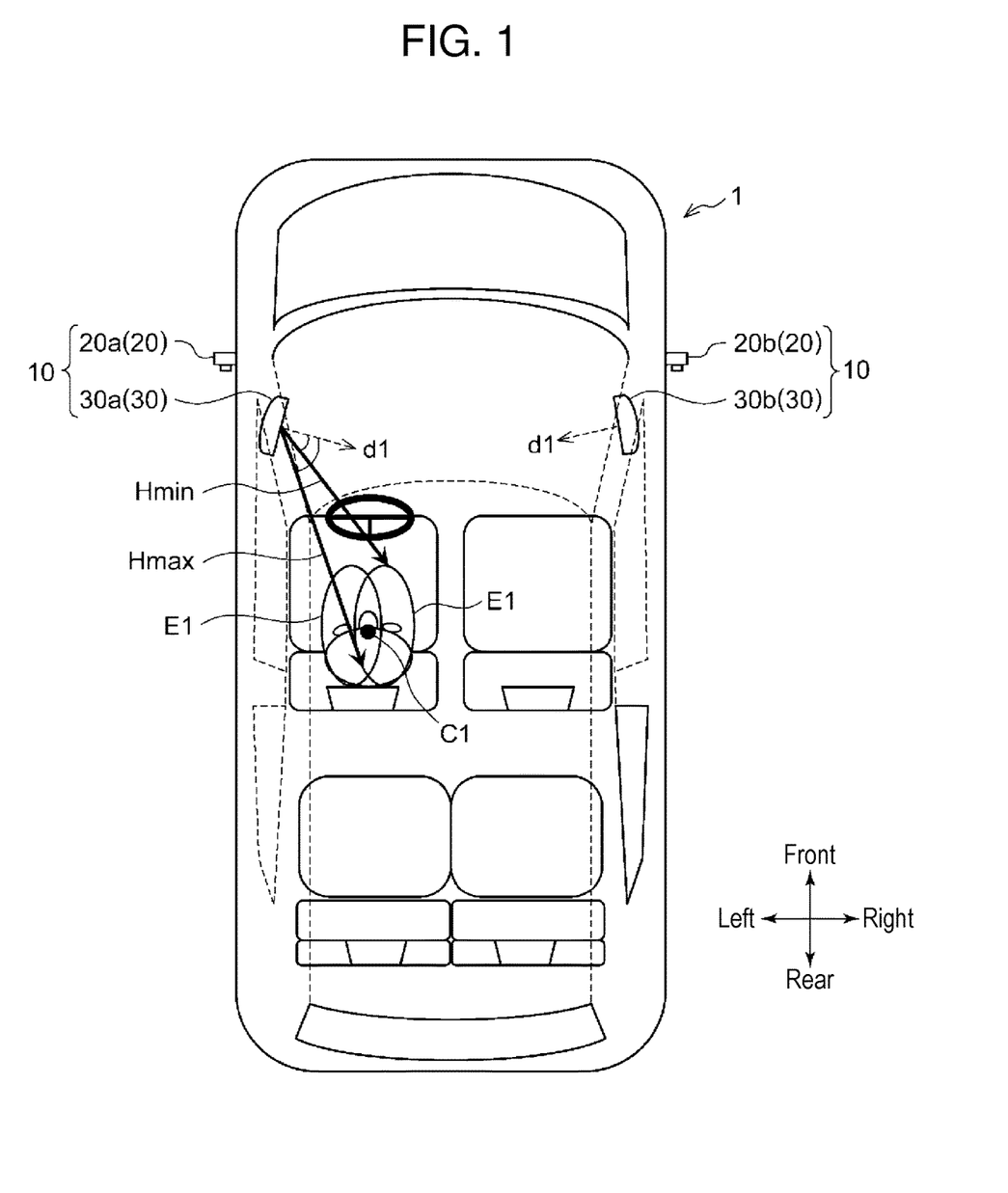
FIG. 1 is a top view schematically illustrating a vehicle on which an electronic mirror system according to an exemplary embodiment is mounted.
Figure 2:
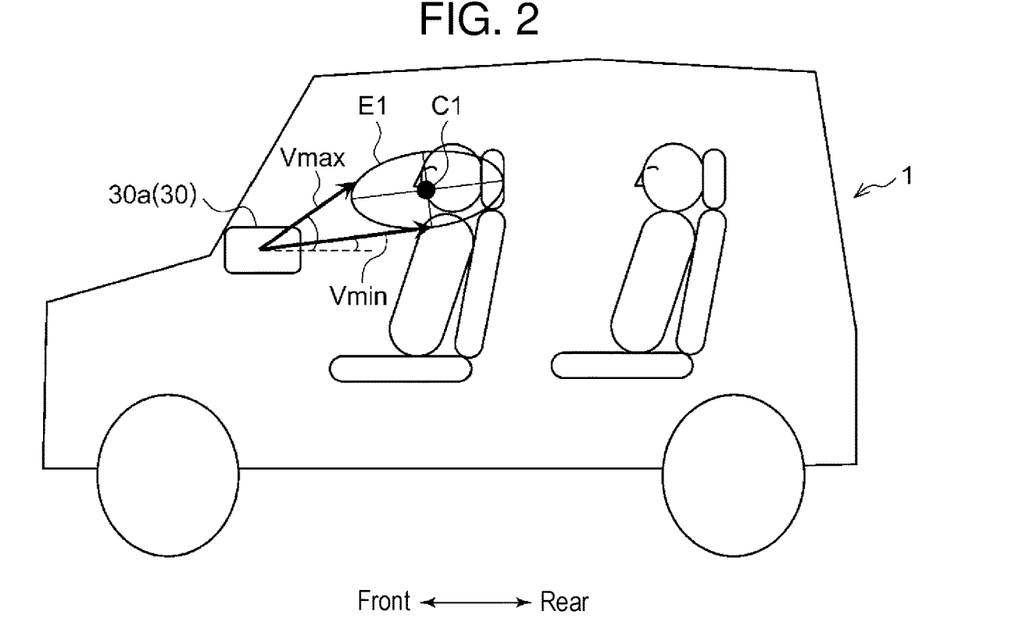
FIG. 2 is a side view schematically illustrating the vehicle of FIG. 1.
Figure 3:
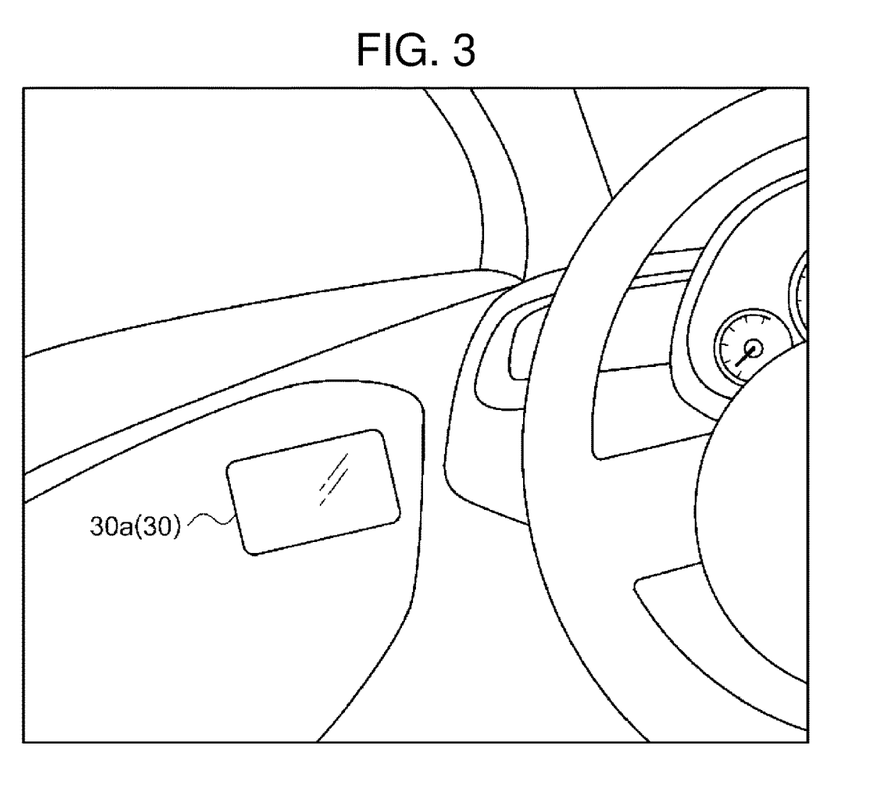
FIG. 3 is a view illustrating an installation position of a first on-board display device of FIG. 1 in a vehicle cabin.

FIG. 1 is a top view schematically illustrating vehicle 1 on which electronic mirror system 10 according to an exemplary embodiment is mounted. FIG. 2 is a side view schematically illustrating vehicle 1 of FIG. 1. FIG. 3 is a view of an inside of a vehicle cabin, illustrating an installation position of first on-board display device 30a of FIG. 1.

Electronic mirror system 10 includes first camera 20a, second camera 20b, first on-board display device 30a, and second on-board display device 30b. First camera 20a is installed on a periphery of a left door in a vehicle cabin exterior, captures an image behind and of a left on an outside of vehicle 1, and supplies image data to first on-board display device 30a. Second camera 20b is installed on a periphery of a right door in the vehicle cabin exterior, captures an image behind and of a right on the outside of vehicle 1, and supplies image data to second on-board display device 30b. "Camera 20" is appropriately used as a generic name of first camera 20a and second camera 20b. Camera 20 is composed by using a charge-coupled device (CCD) image sensor, a complementary metal oxide semiconductor (CMOS) image sensor, or the like. Camera 20 may be provided in the vehicle cabin.

First on-board display device 30a is installed on a left side in the vehicle cabin, and displays the image behind and of the left of vehicle 1, which is captured by first camera 20a. Specifically, as illustrated in FIG. 3, first on-board display device 30a is installed on a front side of an interior of the left door in vehicle 1. Second on-board display device 30b is installed on a right side in the vehicle cabin, and displays the image behind and of the right of vehicle 1, which is captured by second camera 20b. Specifically, second on-board display device 30b is installed on a front side of an interior of the right door in vehicle 1 (not illustrated). "On-board display device 30" is appropriately used as a generic name of first on-board display device 30a and second on-board display device 30b.

Each of FIG. 1 and FIG. 2 illustrates eyelips E1. Eyelips E1 defines eye ranges of driver's right and left eyes as ellipses, and represents the ellipses on a side view and a plan view. The eye ranges statistically represent distributions of driver's eye positions. The eye ranges and eyelips E1 are preset in vehicle 1. If a vehicle type differs, then the eye ranges and eyelips E1 also differ. The eye ranges and eyelips E1 are set also in consideration of movement of a seat position. As seen from FIG. 1, front direction d1 of on-board display device 30 is a direction passing through an outside of eyelips E1, that is, a direction passing through an outside of the eye ranges. Specifically, front direction d1 is a direction passing through front of eyelips E1 and the eye ranges in vehicle 1.

Figure 4:
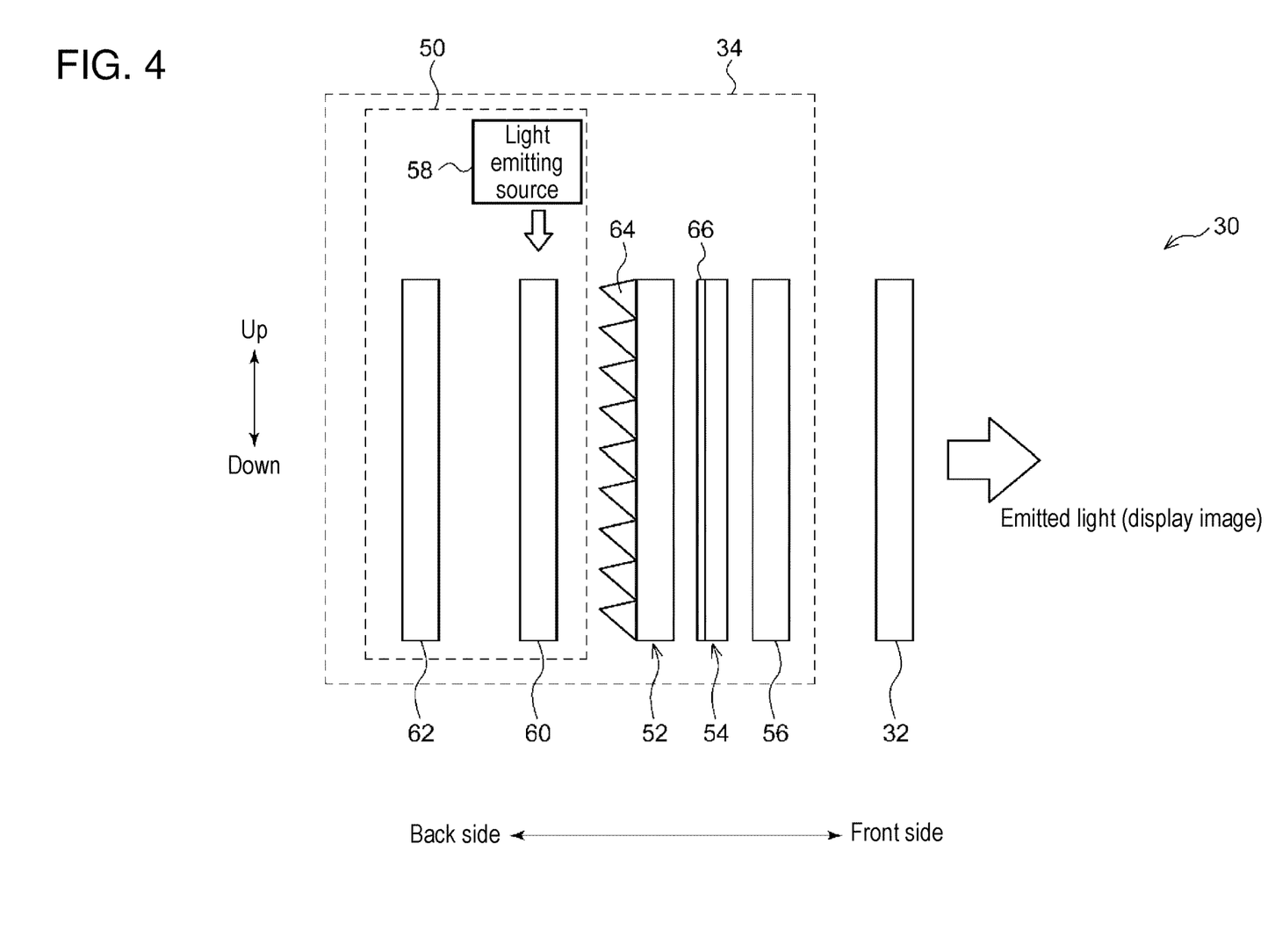
FIG. 4 is a diagram illustrating an arrangement relationship between each constituent of the on-board display device of FIG. 1.

FIG. 4 is a diagram illustrating an arrangement relationship between each constituent of on-board display device 30 of FIG. 1. On-board display device 30 includes liquid crystal panel 32 and backlight 34. Liquid crystal panel 32 is disposed on a front side of on-board display device 30, and displays the image behind and of the side of vehicle 1, the image having been captured by camera 20. Image display of liquid crystal panel 32 is controlled by a controller (not illustrated).

Backlight 34 is disposed on a back side of on-board display device 30, and illuminates liquid crystal panel 32. Backlight 34 functions as a light source. Backlight 34 includes planar light emitter 50, first prism sheet 52, second prism sheet 54, and diffusion sheet 56. Planar light emitter 50 emits light from a light emitting surface. Planar light emitter 50 includes light emitting source 58, light guide plate 60, and reflective plate 62. The light emitting source 58 emits light while on-board display device 30 is on. Light guide plate 60 is a plate-shaped member, for example, made of polycarbonate, diffuses light coming from light emitting source 58 and incident from an end surface, and emits the light toward front of on-board display device 30 substantially uniformly. Reflective plate 62 reflects, toward the front, light that has leaked from light guide plate 60 to a back of on-board display device 30.

First prism sheet 52 is a reverse prism-shaped optical member that is disposed in front of the light emitting surface of planar light emitter 50 and has first prism surface 64 on a back side that a light enters. First prism sheet 52 changes a travel direction of the light incident from light guide plate 60, emits the light toward the front, and adjusts a luminance distribution of emitted light.

Second prism sheet 54 is a reverse prism-shaped optical member that is disposed in front of first prism sheet 52 and has second prism surface 66 on a back side that a light enters. Second prism sheet 54 changes a travel direction of the light incident from first prism sheet 52, emits the light toward the front, and adjusts a luminance distribution of emitted light.

A light component in a predetermined direction can be increased depending on shapes of first prism surface 64 and second prism surface 66. In this exemplary embodiment, the shapes of first prism surface 64 and second prism surface 66 are different from each other, and first prism surface 64 and second prism surface 66 have asymmetrical shapes with respect to a predetermined direction, whereby the direction of the maximum luminance and the luminance distribution are controlled as will be described later. Note that the shapes of first prism surface 64 and second prism surface 66 are not particularly limited as long as the shapes allow the direction of the maximum luminance and the luminance distribution to be controlled as will be described later. Moreover, second prism sheet 54 does not have to be provided if desired optical characteristics can be obtained with use of first prism sheet 52.

Diffusion sheet 56 diffuses the light emitted from second prism sheet 54. The light diffused by diffusion sheet 56 illuminates liquid crystal panel 32.

Figure 5:
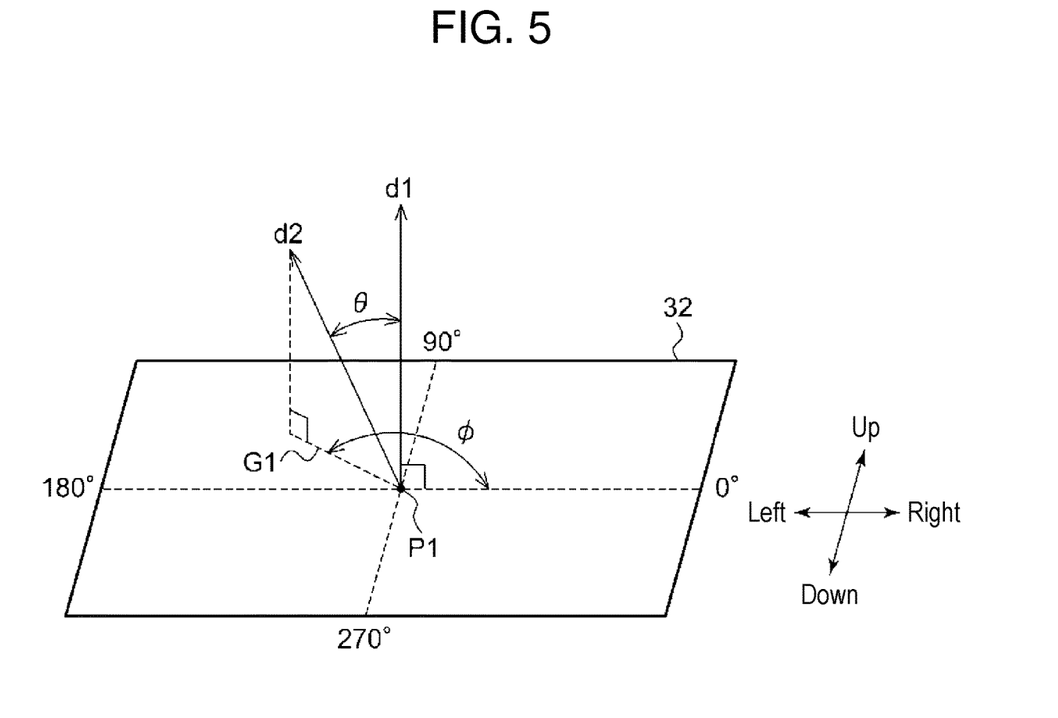
FIG. 5 is a diagram for describing a polar angle and an azimuth angle in the on-board display device of FIG. 1.

Next, the luminance distribution of on-board display device 30 will be described. The luminance distribution is represented based on a polar angle and an azimuth angle. FIG. 5 is a diagram for describing a polar angle and an azimuth angle in on-board display device 30 of FIG. 1. As illustrated in FIG. 5, an angle made by front direction d1 and direction d2 of liquid crystal panel 32 is defined as polar angle θ. Front direction d1 is a direction of a normal line at center P1 of liquid crystal panel 32. Polar angle θ of front direction d1 is 0°. Moreover, an angle made by a right direction in display plane of liquid crystal panel 32 and by line segment G1 when direction d2 is projected onto liquid crystal panel 32 is defined as azimuth angle φ. Azimuth angle φ is assumed to increase counterclockwise when viewed from a point in front direction d1 of liquid crystal panel 32. Therefore, in the display plane of liquid crystal panel 32, azimuth angle φ of the right direction is 0°, azimuth angle φ of an upward direction is 90°, azimuth angle φ of a left direction is 180°, and azimuth angle φ of a downward direction is 270°.

Figure 6:
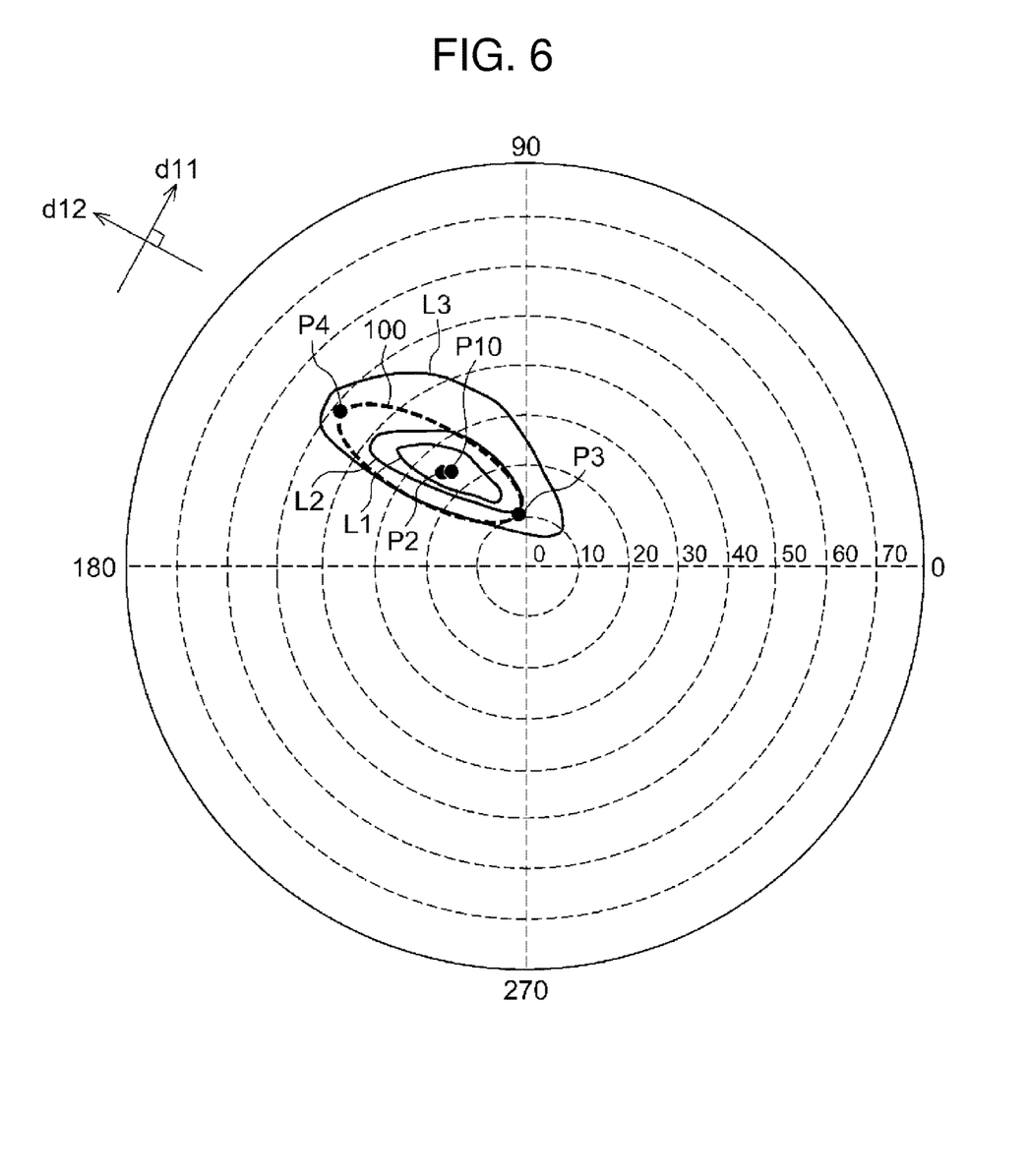
FIG. 6 is a luminance distribution map of the first on-board display device of FIG. 1.

FIG. 6 is a luminance distribution map of first on-board display device 30a of FIG. 1. This luminance distribution map represents an example of luminance of first on-board display device 30a in each direction represented by polar angle θ and azimuth angle φ. The luminance of on-board display device 30 is substantially equivalent to luminance of backlight 34. In FIG. 6, a range of polar angle θ is 0° to 80°, and a range of azimuth angle φ is 0° to 360°. The luminance distribution map includes a plurality of equi-luminance lines L1 to L3. Luminance of equi-luminance line L1 is the highest, and luminance decreases in order of equi-luminance line L2 and equi-luminance line L3.

As illustrated in FIG. 6, a direction of the maximum luminance of backlight 34, which is represented by point P10 on the luminance distribution map, is an obliquely upward direction with respect to front direction d1 of liquid crystal panel 32, and is a direction passing through the inside of each of the eye ranges predetermined in vehicle 1. In the example of FIG. 6, the direction of the maximum luminance of backlight 34 is chiefly the direction passing through the center of the eye range. The direction passing through the center of the eye ranges is represented by point P2 on the luminance distribution map. The center of the eye range coincides with center C1 of eyelips E1 illustrated in FIG. 1 and FIG. 2.

FIG. 100 is an aggregate of points which represent, on the luminance distribution map, polar angles θ and azimuth angles φ of tangential lines of the eye range, which pass through center P1 of liquid crystal panel 32. In the example of FIG. 6, FIG. 100 is roughly elliptical. That is, FIG. 100 has a shape extending in a major axis direction, namely a longitudinal direction. It can also be said that FIG. 100 represents, on the luminance distribution map, polar angles θ and azimuth angles φ at each position in a contour of the eye range viewed from center P1 of liquid crystal panel 32. FIG. 100 is represented by using the eye range of the right eye. FIG. 100 may be determined by using the eye range of the left eye, or may be determined by using the eye ranges of the right eye and the left eye. For example, FIG. 100 may be determined by using a contour of a region obtained by adding up the eye range of the right eye and the eye range of the left eye.

Point P3 on FIG. 100 corresponds to tangential line Hmin of eyelips E1, in which an angle with respect to front direction d1 illustrated in FIG. 1 is the minimum, and to tangential line Vmin of eyelips E1, in which an angle with respect to a rear direction in vehicle 1 illustrated in FIG. 2 is the minimum. Point P4 on FIG. 100 corresponds to tangential line Hmax of eyelips E1, in which an angle with respect to front direction d1 illustrated in FIG. 1 is the maximum, and to tangential line Vmax of eyelips E1, in which an angle with respect to the rear direction in vehicle 1 illustrated in FIG. 2 is the maximum.

In the luminance distribution map, equi-luminance lines L1 to L3 have shapes longer in second direction d12 perpendicular to first direction d11 than in first direction d11. That is, equi-luminance lines L1 to L3 have shapes extending in second direction d12. Second direction d12 and the longitudinal direction of FIG. 100 are inclined to a same side with respect to a longitudinal direction of liquid crystal panel 32, that is, the right direction in which the azimuth angle φ is 0° or the left direction in which the azimuth angle φ is 180°. Specifically, second direction d12 and the longitudinal direction of FIG. 100 are inclined in a direction in which azimuth angle φ is smaller than 180° with respect to the left direction. Herein, first direction d11 and second direction d12 are directions in the luminance distribution map of FIG. 6, and are directions in a plane that illustrates the luminance distribution map. In the luminance distribution map of FIG. 6, second direction d12 may be, for example, a direction that represents a straight line passing through any two points among point P2, point P3, point P4 and point P10. Moreover, second direction d12 does not have to strictly be the direction that represents such a straight line, and may be a direction approximated by the straight line passing through any two points among point P2, point P3, point P4 and point P10.

Though not illustrated, also in second on-board display device 30b on the right side in the vehicle 1, second direction d12 of equi-luminance lines and a longitudinal direction of FIG. 100 are inclined to a same side with respect to a longitudinal direction of liquid crystal panel 32. Specifically, second direction d12 and the longitudinal direction of FIG. 100 are inclined in a direction in which azimuth angle φ is larger than 0° with respect to the right direction.

Luminance of backlight 34 in the direction of each position in the contour of the eye range when viewed from center P1 of liquid crystal panel 32, that is, luminance of backlight 34 in a direction indicated by each point on FIG. 100 in the luminance distribution map is, for example, 50% or more of the maximum luminance of backlight 34. Hence, the luminance of each position in the eye range is 50% or more of the maximum luminance of backlight 34.

Next, overall operations of electronic mirror system 10 constituted as described above will be described. When electronic mirror system 10 is turned on, camera 20 captures the image behind and of the side of vehicle 1, and on-board display device 30 displays the captured image behind and of the side of vehicle 1 by using the light of backlight 34. The driver whose eyes are located in the eye ranges can visually recognize the image with luminance of 50% or more of the maximum luminance of backlight 34.

Figure 7:
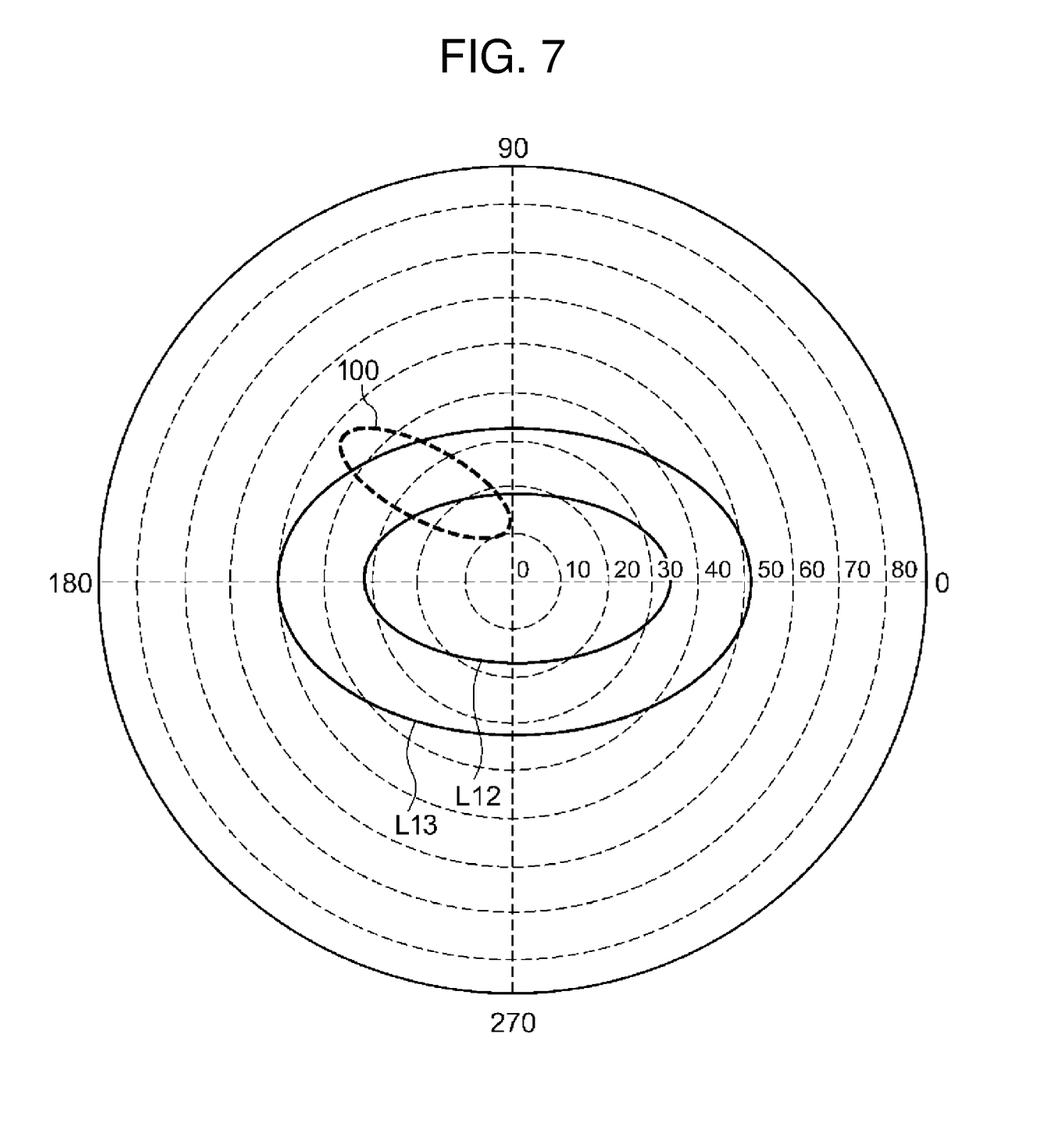
FIG. 7 is a luminance distribution map of a backlight of an on-board display device of a comparative example.

Herein, an on-board display device of a comparative example will be described. FIG. 7 is a luminance distribution map of a backlight of the on-board display device of the comparative example. This luminance distribution map includes equi-luminance lines L12 and L13. Luminance of equi-luminance line L12 is higher than luminance of equi-luminance line L13. A direction of a maximum luminance of the backlight of the comparative example is chiefly the front direction. Therefore, when the on-board display device of the comparative example is installed at the installation position of the exemplary embodiment in FIG. 1, a deviation between the center of the eye ranges and the direction of the maximum luminance of the backlight is larger than in the exemplary embodiment of FIG. 5. Moreover, luminance in each direction of major parts in FIG. 100 of the luminance distribution map is lower than in the exemplary embodiment. Hence, it is difficult for the driver to visually recognize an image, which is displayed on a liquid crystal panel, with sufficient luminance.

Particularly, at the installation position of FIG. 1, direct sunlight is likely to hit the liquid crystal panel of the on-board display device, and when the direct sunlight hits the same, it becomes more difficult for the driver to visually recognize the image. Moreover, since a temperature of the on-board display device is likely to rise when the direct sunlight hits the same, it is difficult to increase overall luminance by enhancing power consumption of the backlight from a viewpoint of preventing the rise of the temperature.

In contrast, in accordance with the exemplary embodiment, the direction of the maximum luminance of backlight 34 is the direction passing through the inside of the eye range. Moreover, in the luminance distribution map that represents the luminance of backlight 34 in each direction, equi-luminance lines L1 to L3 have shapes long in second direction d12, and second direction d12 and the longitudinal direction of FIG. 100 are inclined to the same side with respect to the longitudinal direction of liquid crystal panel 32. In this way, more light can be condensed into the eye range than in the comparative example under the same power consumption as in the comparative example. Therefore, the luminance in the direction of the driver's eyes can be enhanced more than in the comparative example without increasing the power consumption and without depending on the driver and the seat position. Hence, it can be made easy for the driver to visually recognize the image.

Moreover, even if the direct sunlight hits liquid crystal panel 32 of on-board display device 30, it can be made easy for the driver to visually recognize the image since the luminance in the direction of the driver's eyes is higher than in the comparative example.

Moreover, the direction of the maximum luminance of backlight 34 is the obliquely upward direction with respect to front direction d1 of liquid crystal panel 32, and accordingly, on-board display device 30 can be installed at each of positions on right and left of the driver, the positions being looked down at by the driver. Therefore, the driver can be caused to visually recognize the image behind and of the side of the vehicle in a line-of-sight direction approximate to that in a case of a side mirror using a mirror.

Moreover, the direction of the maximum luminance of backlight 34 is chiefly the direction passing through the center of the eye range, and accordingly, more light can be condensed into the eye range.

Furthermore, front direction d1 of liquid crystal panel 32 is the direction passing through the outside of the eye range, and accordingly, on-board display device 30 can be installed at a position and an orientation, in which front direction d1 of liquid crystal panel 32 is not directed to the driver's eye.

The present disclosure has been described above according to the exemplary embodiment. It will be understood by those skilled in the art that the exemplary embodiment is merely an example, that other modifications in which constituents and/or processes of the exemplary embodiment are variously combined are possible, and that the other modifications still fall within the scope of the present disclosure.

Figure 8:
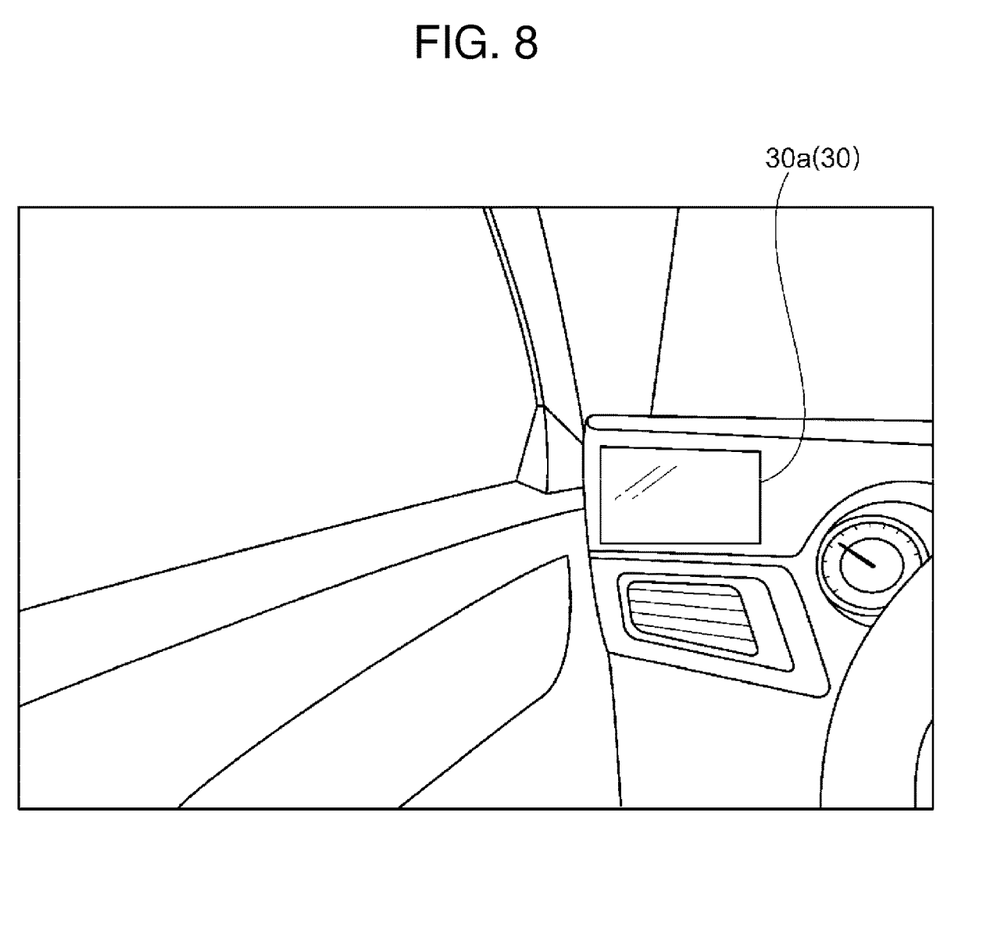
FIG. 8 is a view illustrating an installation position of a first on-board display device according to a modification in the vehicle cabin.

For example, the installation position of on-board display device 30 is not limited to the example illustrated in FIG. 1 and the like. FIG. 8 is a view of an inside of a vehicle cabin, illustrating an installation position of first on-board display device 30a according to the modification. As illustrated in FIG. 8, first on-board display device 30a may be installed on left of an instrument panel in the vehicle cabin. Though not illustrated, second on-board display device 30b may be installed on right of the instrument panel in the vehicle cabin. In this case also, the direction of the maximum luminance and luminance distribution of the backlight are set similarly to the exemplary embodiment described above. This modification can also support a vehicle that cannot install on-board display device 30 on an interior of a door. Moreover, in this modification, front direction d1 of liquid crystal panel 32 of first on-board display device 30a may be a direction passing through the inside of the eye range. This case can also support installation of first on-board display device 30a, in which front direction d1 of liquid crystal panel 32 is a direction deviating from the center of the eye range though passes through the inside of the eye range.

An aspect of the present disclosure is as follows.

[Item 1]

An on-board display device installable in a vehicle cabin of a vehicle includes a liquid crystal panel and a light source. The liquid crystal panel displays an image of an outside of the vehicle, the image having been captured by a camera. The light source illuminates the liquid crystal panel. A direction of maximum luminance of the light source is a direction passing through an inside of an eye range preset in the vehicle. An equi-luminance line has a shape longer in a second direction that intersects a first direction than in the first direction in a luminance distribution map that represents luminance of the light source in each direction represented by a polar angle and an azimuth angle. The second direction and a longitudinal direction of an aggregate of points which represent polar angles and azimuth angles of tangential lines of the eye range, the tangential lines passing through the center of the liquid crystal panel, in the luminance distribution map are inclined to a same side with respect to a longitudinal direction of the liquid crystal panel.

In accordance with this aspect, more light can be condensed into the eye range than in the comparative example under the same power consumption as in the comparative example. Therefore, the luminance in the direction of the driver's eyes can be enhanced more than in the comparative example without increasing the power consumption and without depending on the driver and the seat position. Hence, it can be made easy for the driver to visually recognize the image.

[Item 2]

In the on-board display device according to Item 1, the direction of the maximum luminance of the light source may be an obliquely upward direction with respect to a front direction of the liquid crystal panel.

In this case, the on-board display device can be installed at each of positions on right and left of the driver, the positions being looked down at by the driver. Therefore, the driver can be caused to visually recognize the image behind and of the side of the vehicle in a line-of-sight direction approximate to that in a case of a side mirror using a mirror.

[Item 3]

In the on-board display device according to Item 1 or 2, the direction of the maximum luminance of the light source may be the direction passing through the center of the eye range.

In this case, more light can be condensed into the eye range.

[Item 4]

In the on-board display device according to any one of Items 1 to 3, a front direction of the liquid crystal panel may be a direction passing through an outside of the eye range.

In this case, the on-board display device can be installed at a position and an orientation, in which the front direction of the liquid crystal panel is not directed to the driver's eye.

[Item 5]

In the on-board display device according to any one of Items 1 to 3, a front direction of the liquid crystal panel may be a direction passing through the inside of the eye range.

This case can also support installation of the on-board display device, in which the front direction of the liquid crystal panel is a direction deviating from the center of the eye range though passes through the inside of the eye range.

[Item 6]

In the on-board display device according to any one of Items 1 to 5, the light source may include a planar light emitter and a prism sheet. The planar light emitter emits light from a light emitting surface. The prism sheet is a reverse prism-shaped prism sheet that is disposed on the light emitting surface of the planar light emitter, and has a prism surface on a side of the light emitting surface.

In this case, the light source can be achieved by a simple configuration.

INDUSTRIAL APPLICABILITY

The present disclosure relates to an on-board display device, and is particularly useful as an on-board display device that displays an image of a lateral side on a rear of a vehicle, the image having been captured by a camera.

REFERENCE MARKS IN THE DRAWINGS 1 vehicle
10 electronic mirror system
20 camera
20a first camera
20b second camera
30 on-board display device
30a first on-board display device
30b second on-board display device 32 liquid crystal panel
34 backlight
50 planar light emitter
52 first prism sheet
54 second prism sheet
56 diffusion sheet
58 light emitting source
60 light guide plate
62 reflective plate
64 first prism surface
66 second prism surface
100 figure
C1 center
E1 eyelips
G1 line segment
Hmax tangential line
Hmin tangential line
Vmax tangential line
Vmin tangential line
L1, L2, L3 equi-luminance line
L12, L13 equi-luminance line
P1 center
P2 point
P3 point
P4 point
P10 point
d1 front direction
d2 direction
d11 first direction
d12 second direction

The invention claimed is:

1. An on-board display device for a vehicle, comprising:
a liquid crystal panel that displays an image; and
a light source that illuminates the liquid crystal panel, wherein
a direction of maximum luminance of the light source passes through an inside of an eye range preset in the vehicle,
wherein a longitudinal direction of an equi-luminance line on a luminance distribution map and a longitudinal direction of an aggregate of points corresponding to a contour of the eye range on the luminance distribution map are inclined to a same side,
the equi-luminance line representing luminance of the light source in each direction represented by a polar angle and an azimuth angle,
the eye range statistically representing distributions of driver's eye positions,
the aggregate of points representing polar angles and azimuth angles of tangential lines of the eye range, the tangential lines passing through a center of the liquid crystal panel, and
the direction of the maximum luminance of the light source is one obliquely upward direction only with respect to a normal of a display plane of the liquid crystal panel.

2. The on-board display device according to claim 1, wherein an inclination in the longitudinal direction of the equi-luminance line and an inclination in the longitudinal direction of the aggregate of points on the luminance distribution map are substantially same.

3. The on-board display device according to claim 1, wherein the direction of the maximum luminance of the light source passes substantially through a center of the eye range.

4. The on-board display device according to any one of claim 1, wherein the normal of the display plane of the liquid crystal panel passes through an outside of the eye range.

5. The on-board display device according to claim 1, wherein the normal of the display plane of the liquid crystal panel passes through the inside of the eye range.

6. The on-board display device according to claim 1, wherein a luminance of the light source in at least one position in the contour of the eye range is 50% or more of the maximum luminance of the light source.

7. The on-board display device according to claim 6, wherein a luminance of the light source in a direction of a straight line passing through a center of the liquid crystal panel and at least one position in the contour of the eye range is 50% or more of the maximum luminance of the light source.

8. The on-board display device according to claim 1, wherein
the light source includes:
a planar light emitter that emits light from a light emitting surface of the planar light emitter; and
a reverse prism-shaped prism sheet that is located between the liquid crystal panel and the light emitting surface of the planar light emitter, and has a prism surface located between the reverse prism-shaped prism sheet and the light emitting surface.

* * * * *